United States Patent Office 2,928,711
Patented Mar. 15, 1960

2,928,711
NEW COLOURATION PROCESS

Ronald Leonard Denyer and Harry Rose Hadfield, Manchester, England, assignors to Imperial Chemical Industries Limited, London, England, a corporation of Great Britain No Drawing. Application November 18, 1957
Serial No. 696,926

Claims priority, application Great Britain
November 21, 1956

13 Claims. (Cl. 8—29)

This invention relates to a new colouration process and more particularly it relates to a process for the colouration of cellulosic textile materials such as cotton, linen or viscose rayon in shades having extremely good fastness to washing.

According to the invention there is provided a process for the colouration of cellulosic textile materials which comprises applying to the material an alkali, a water-soluble heterocyclic compound containing two —N=C-(halogen)-groups and a dyestuff containing at least one reactive amino group as herein defined and in a subsequent step heating or steaming the textile material.

Suitable alkalis include, for example, sodium bicarbonate, sodium carbonate, sodium borate, sodium metasilicate, sodium hydroxide, and trisodium phosphate.

Suitable heterocyclic compounds include, for example, 2:3-dichloroquinoxaline-6-carboxylic acid and more particularly the compounds obtained by condensation of a 2:4:6-tri-halogenopyrimidine or a cyanuric halide, especially cyanuric chloride with an equimolecular proportion of an amine, hydroxy or mercapto compound containing one or more solubilising groups. Thus there may be used the primary condensation products of cyanuric chloride and such amines as 1-naphthylamine-5- and -7-sulphonic acids, 2-naphthylamine-6- and -7-sulphonic acids, 2-methylaminonaphthalene-6-sulphonic acid, benzidine disulphonic acid, p-aminophenyl-beta-hydroxy ethyl ether sulphuric ester, 2-naphthylamine-1:6-, -4:8-, -5:7- and -6:8-disulphonic acids, 1-naphthylamine-4:6:8-trisulphonic acid, sulphanilic acid, 3-amino-5-sulpho-2-hydroxybenzoic acid, p-phenylene diamine sulphonic acid, orthanilic acid, metanilic acid, m-phenylene diamine-4-sulphonic acid, aminomethane phosphoric acid, m-aminophenyl trimethylammonium bromide, p-aminobenzoic acid, taurine, N-methyltaurine, N-phenylglycine, 4:4'-diaminostilbene-2:2'-disulphonic acid, and 2-amino-8-naphthol-6-sulphonic acids. There may also be used the primary condensation products of cyanuric chloride and hydroxy and mercapto compounds such as 2-thionaphthol-6-sulphonic acid.

However the heterocyclic compounds are not limited in use to the colourless compounds obtained from the starting materials just mentioned. There may also be used a coloured heterocyclic compound containing two groups of the type —N=C(halogen)— thereby obtaining heavy secondary or tertiary shades having good fastness to washing. Such shades cannot at present be easily obtained with dyestuffs at present commercially available which either contain an amino group or one or more groups of the type —N=C(halogen). The particular shades of dyestuff and coloured heterocyclic compound used should be chosen in accordance with the commonly accepted methods of mixing dyestuffs having primary or secondary shades in order to obtain secondary or tertiary shades.

Suitable coloured heterocyclic compounds for example of the azo, anthraquinone, nitro and phthalocyanine series are described in British specifications Nos. 772,030, 774,925, 781,930, 785,120 and 785,222 and in Belgian specifications Nos. 552,910, 556,092, 557,162 and 558,390.

A reactive amino group for the purpose of this invention is one in which there is present a hydrogen atom which may be readily replaced by treating the dyestuff with one molecular proportion of cyanuric chloride at 20° C. in aqueous medium.

Suitable dyestuffs for use in the process include, for example, p-aminophenylazo-salicylic acid, 1:8-dihydroxy-4:5-diaminoanthraquinone-2:7-disulphonic acid, the 2:3-chromium complex of 3:5-dinitro-2':4'-diamino-2-hydroxyazobenzene-5'-sulphonic acid, Naphthalene Dark Green A (Colour Index No. 20,495), Duranol Brilliant Blue CB (Colour Index No. 64,500), Solochrome Brown EB (Colour Index No. 20,110), Solochrome Yellow 2GN (Colour Index No. 14,045), Chlorazol Black BH (Colour Index No. 22,590), Chlorazol Brown MP (Colour Index No. 22,311), Ultralan Orange R (Colour Index No. 18,870) and Chlorazol Sky Blue FF (Colour Index No. 24,410). The Colour Index Numbers are those given in the second edition of the Colour Index published jointly in 1957 by the Society of Dyers and Colourists and the American Association of Textile Chemists and Colorists.

It is preferred, especially when the textile material is treated with the dyestuff before or at the same time as the heterocyclic compound, to use substantially equimolecular proportions of the dyestuff and the heterocyclic compound, although smaller amounts, which may be as little as one-half of one molecular proportion of heterocyclic compound may be used with good effect.

The process of the invention may be carried out in a number of ways and dyeing or textile printing methods may be used according to whether it is desired to obtain overall or local colouration of the material.

When it is desired to colour the entire surface of the material, the dyestuff, especially if its is a dyestuff having poor affinity for cellulosic materials such as a disperse or an acid dyestuff, may be applied by padding the textile material in an aqueous solution or suspension of the dyestuff. Dyestuffs having good affinity for cellulosic materials, that is to say, direct dyestuffs, may be applied by the commonly-used methods for dyeing and printing cellulosic materials with such dyestuffs.

In one particularly valuable method of carrying out the new colouration process by a textile printing technique, the heterocyclic compound, dyestuff and alkali preferably sodium bicarbonate, are all included in the one printing paste which may be applied to the textile material by any of the commonly-used methods such as roller, block or screen, and the printed material is then dried and steamed.

When any step in the colouration process being a padding or a printing step, has been carried out, it is preferred in general to dry the textile material, preferably at a temperature below 100° C. before carrying out the next step.

The treatment of the textile material with the heterocyclic compound may be carried out prior to, simultaneously with, or after the treatment with the dyestuff. The alkali is preferably applied simultaneously with the heterocyclic compound, a mild alkali such as sodium bicarbonate being used. However, the alkali may also be applied in a separate step and under these circumstances, other, more alkaline, substances such as sodium carbonate, caustic soda and sodium metasilicate may be used with equal effect.

The amount of alkali used can vary over a wide range, usually there is used between 0.1% and 5% by weight of the medium in which it is applied, and preferably between 1% and 2% by weight of the medium.

The solutions, suspensions and printing pastes containing alkali, dyestuff and/or heterocyclic compound may also contain the adjuvants commonly used in dyeing and padding solutions and suspensions and textile printing pastes.

Such adjuvants include, for example, migration inhibitors such as ethers of cellulose, sodium chloride and sodium sulphate, wetting agents such as poly-ethylene oxide condensates of alcohols, sulphonated fatty alcohols and sulphonated oils, solution aids such as urea and thiodiglycol and thickening agents such as gum arabic, starch, gum tragacanth and preferably sodium alginate.

The duration of the steaming or heating step may vary over a wide range of times according to the circumstances. In general steaming is carried out at a temperature between 100° C. and 130° C. for a period of time between 3 minutes and 1 hour or longer, preferably for between 5 and 10 minutes. A heating step may be carried out between 100° C. and 150° C. for 3 minutes to 30 minutes or longer, preferably for about 5 minutes at 150° C.

When the dyestuff or heterocyclic compound used in the process contains a metal-complex-forming system, such as a o-hydroxy carboxylic acid or a o:o'-dihydroxyazobenzene grouping, the new process may advantageously incorporate a treatment with a metal-yielding agent such as copper sulphate, cobalt sulphate, nickel sulphate, ferrous sulphate or chromium acetate, in order to improve the fastness to light of the resultant colourations.

The textile materials coloured by the new process are advantageously scoured, for example by boiling in soap or detergent solutions, in order to improve still further the fastness to washing.

The process of the invention enables cellulosic textile materials to be coloured in a wide variety of shades having far greater fastness to washing than the shades obtainable from the same dyestuffs by the commonly-used techniques.

It is known from Belgian specification No. 548,117 corresponding to copending British application No. 15,329/55 that cellulosic textile materials may be mordanted for basic dyestuffs and dyestuffs containing isothiouronium salt groups by treatment under alkaline conditions with a water-soluble non-dyestuff compound containing a halogeno-s-triazinylamino group. The process of the present invention differs in that the dyestuffs used in the new process contain an amino group which has at least one hydrogen atom attached to the nitrogen, and the resultant colourations have improved fastness to washing than those obtained in the known process.

It has previously been proposed to improve the fastness to wet treatments of textile materials which have been dyed with a dyestuff containing at least one reactive hydrogen atom, by treating the dyed textile material with a heterocyclic substance containing in the heterocyclic ring at least one grouping of the formula —N=C(halogen)—. In particular there has been described the treatment of a dyed textile material with an aqueous emulsion of a solution of cyanuric chloride or 2:4:6-trichloroquinazoline in benzene and carbon tetrachloride.

The previously described processes however are difficult to apply in practice because of the toxic hazard involved in the use of these organic solvents. Furthermore the fastness to wet treatment of textile materials so treated is usually uneven.

The present process has the advantage that the toxic hazard is avoided and also that the improvement in fastness to wet treatments is uniform.

The invention is illustrated but not limited by the following examples in which parts are by weight:

*Example 1*

100 parts of bleached plain weave cotton fabric are padded with an aqueous solution containing 2% of Solochrome Yellow 2GNS, 2% of 6-(4':6'-dichlorotriazinylamino)naphthalene-2-sulphonic acid and 2% of sodium bicarbonate, and the fabric is then squeezed between rollers until its weight is 200 parts.

The fabric is then steamed at 102° C. for 5 minutes, rinsed in water, scoured in a boiling solution consisting of 3 parts of a detergent mixture, consisting of alkyl phenols condensed with ethylene oxide and sulphated fatty alcohol, in 1000 parts of water rinsed again in water and dried.

The cotton is dyed a yellow shade which is very fast to washing.

*Example 2*

If the fabric dyed as described in Example 1 is treated in a 1% solution of copper sulphate for 20 minutes at 85° C., and then rinsed in water and dried, the fastness to light is improved.

*Example 3*

100 parts of bleached plain weave cotton fabric are dyed by the method of Example 1 except that 5 parts of 32° Tw. chromium acetate solution are added to every 100 parts of padding liquor.

The yellow dyeing thus produced possesses excellent fastness to washing and to light.

*Example 4*

If the Solochrome Yellow 2GNS used in Example 1 is replaced by an equal weight of Solochrome Brown EBS a yellowish-brown dyeing is obtained having excellent fastness to washing.

If treated with copper sulphate as described in Example 2, this dyeing turns redder in shade, and the lightfastness is improved. The reddish-brown shade may be also obtained by the method of Example 1 by adding 1% of copper sulphate to the padding liquor.

*Example 5*

If the 6-(4':6'dichloro-s-triazinylamino)naphthalene-2-sulphonic acid used in Example 1 is replaced by an equal weight of the dyestuff obtained as described in Example 1 of Belgian specification No. 543,214, a bright red dyeing is obtained having excellent fastness to washing.

By also adding 0.2% of copper sulphate or 5% of 32° Tw. chromium acetate solution of the padding solution, a dull red dyeing is obtained which has improved fastness to light.

*Example 6*

If the Solochrome Yellow 2GNS used in Example 1 is replaced by an equal weight of Naphthalene Dark Green A 150 powder a green dyeing is obtained very fast to wet treatments.

A navy blue dyeing is obtained by the method of Example 1 if Naphthalene Dark Green A is used in place of the Solochrome Yellow 2GNS and the compound of Example 1 of Belgian specification No. 543,214 is used in place of the dichlorotriazinylaminonaphthalene sulphonic acid.

A pale blue dyeing is obtained by the method of Example 1 if Duranol Brilliant Blue CB is used in place of the Solochrome Yellow 2GNS and a purple shade if also the dichlorotriazinylamino-naphthalene sulphonic acid is replaced by the compound of Example 1 of Belgian specification No. 543,214.

An orange dyeing is obtained if Ultralan Orange RS is used in place of the Solochrome Yellow 2GNS.

All these dyeings are very fast to washing.

*Example 7*

100 parts of bleached plain weave cotton fabric are padded with a 2% aqueous solution of 6-(4':6'-dichlorotriazinylamino)naphthalene-2-sulphonic acid, squeezed between rollers until the weight of the fabric is 200 parts and dried at 40° C. The dried fabric is then padded with an aqueous solution or suspension containing 2% of one of the dyestuffs tabulated below, 2% of sodium bicarbonate and, where indicated in the table, 0.2% of copper sulphate crystals or 5% of a 32° Tw. solution of chromium acetate, and squeezed until its weight is 200 parts and steamed for 5 minutes at 102° C. The fabric is then rinsed and scoured as described in Example 1 and dried. The coloured effects produced are shown in the table below. In each case the dyed fabric possesses excellent fastness to washing.

| Dyestuff | Shade obtained | | |
|---|---|---|---|
| | Alone | +Copper Sulphate | +Chromium Acetate |
| Solochrome Yellow 2GNS | yellow | | yellow. |
| Solochrome Brown EBS | yellow-brown. | reddish-brown. | |
| Naphthalene Dark Green A 150 | dark green. | | |
| Duranol Brilliant Blue CB | blue | | |

*Example 8*

100 parts of cotton fabric are padded with a 2% aqueous solution of the dyestuff obtained as described in Example 1 of Belgian specification No. 543,214, and is then dried at 40° C.

The dried cloth is then padded with an aqueous solution containing 2% of one of the dyestuffs tabulated below, 2% of sodium bicarbonate and, where indicated in the table, 0.2% of copper sulphate crystals or 5% of a 32° Tw. solution of chromium acetate solution. The cloth is then squeezed between rollers until its weight is 200 parts, and steamed for 5 minutes at 102° C. The cloth is then rinsed and scoured as described in Example 1 and dried. The coloured effects produced are shown in the table. In every case the dyed fabric possessed excellent fastness to washing.

| Dyestuff | Shade obtained | | |
|---|---|---|---|
| | Alone | +Copper Sulphate | +Chromium Acetate |
| Solochrome Yellow 2GNS | red | red | |
| Solochrome Brown EBS | | | reddish-brown. |
| Naphthalene Dark Green A 150 | navy-blue | | |
| Duranol Brilliant Blue CB | violet | | |

*Example 9*

A printing paste is made up by dissolving 2 parts of 1:8-dihydroxy-4:5-diaminoanthraquinone-2:6-disulphonic acid and 10 parts of urea in 20 parts of water, adding this solution to 35 parts of 5% sodium alginate solution, adding a solution of 1 part of 6-(4':6'-dichlorotriazinylamino)naphthalene-2-sulphonic acid in 31 parts of water, and then adding 1 part of sodium bicarbonate.

The printing paste is applied to mercerised cotton sateen by screen printing and the fabric is dried, steamed for 10 minutes then rinsed and scoured as described in Example 1.

A blue print is obtained very fast to washing.

*Example 10*

A printing paste is made up as described in Example 9 but using 2:5-bis-(4':6'-dichloro-s-triazinylamino)benzene sulphonic acid in place of the 6-(4':6'-dichloro-s-triazinylamino)naphthalene-2-sulphonic acid. The paste is printed on cotton fabric and the fabric is dried, steamed, rinsed and scoured as described in Example 9. A blue print, very fast to washing, is obtained.

A bottle green print, very fast to washing is obtained by the method of Example 9 using a printing paste made up by dissolving 3 parts of Naphthalene Dark Green A 200 and 15 parts of urea in 20 parts of water, adding the solution to 35 parts of 5% aqueous sodium alginate solution, then adding a solution of 1 part of 2-(4':6'-dichloro-s-triazinylamino)naphthalene-7-sulphonic acid in 25 parts of water, and finally adding 1 part of sodium bicarbonate.

A black print is obtained by the method of Example 9 using a printing paste made up by dissolving 4 parts of Naphthalene Dark Green A 200 and 15 parts of urea in 20 parts of water, adding the solution to 35 parts of 5% aqueous sodium alginate solution, then adding a solution of 2.5 parts of the dyestuff described in Example 3 of Belgian specification No. 543,214, 0.5 part of the dyestuff described in Example 1 of Belgian specification No. 543,215 and 3 parts of urea in 21 parts of water and finally adding 1 part of sodium bicarbonate.

An orange print is obtained by the method of Example 9 using a printing paste made up as described in Example 9 but using 2 parts of Ultralan Orange RS in place of the dihydroxy-4:5 - diaminoanthraquinone - 2:7 - disulphonic acid.

*Example 11*

A printing paste is made up by adding a solution of 20 parts of urea and 5 parts of the dyestuff described in Example 1 of Belgium specification No. 543,214 in 24 parts of water to 40 parts of 5% aqueous sodium alginate solution. 10 parts of Duranol Brilliant Blue CB 200 Paste Fine are then added and finally 1 part of sodium bicarbonate.

The printing paste is applied to cotton cloth, and the cloth is then dried, steamed for 30 minutes, rinsed in water, scoured in boiling detergent solution for 10 minutes and dried.

A dark green print very fast to washing is obtained.

*Example 12*

A printing paste is made up by adding a solution of 15 parts of urea and 2 parts of Solochrome Brown EBS in 20 parts of water to 35 parts of an 18% solution of a cellulose methyl ether thickening agent, then there are added in succession a solution of 1 part of 2-(4':6'-dichloro-s-triazinylamino) naphthalene-6-sulphonic acid in 22 parts of water, 1 part of sodium bicarbonate and finally 4 parts of an aqueous solution of chromium acetate of specific gravity 1.16.

The printing paste is applied to cotton by roller, and the cotton is dried, steamed for 10 minutes, rinsed and scoured as described in Example 1 and dried.

A brown print very fast to washing is obtained, the shade being duller than in a print obtained from a printing paste made up as described above, but omitting the chromium acetate solution. If the chromium acetate solution is replaced by 4 parts of a 10% aqueous solution of copper sulphate, a drab brown shade is obtained.

*Example 13*

A printing paste is made up by adding a solution of 15 parts of urea and 2 parts of Solochrome Yellow 2GNS in 22 parts of water to 35 parts of a 18% aqueous solution of a methyl cellulose thickening agent then there are added in succession 25 parts of a 4% aqueous solution of 6 - (4':6' - dichlorotriazinylamino)naphthalene-2-sulphonic acid and then 1 part of sodium bicarbonate.

The printing paste is applied to cotton fabric by roller, then the fabric is dried, steamed for 10 minutes, rinsed and scoured as described in Example 1 and rinsed in cold water. The fabric is then treated for 10 minutes at 90° C. in an aqueous solution containing 0.2% of sodium bichromate and 0.2% of acetic acid. The fabric is rinsed and dried. A yellow shade is obtained, redder than the shade of printed fabric which had not been treated in the acidified sodium bichromate solution.

If the after-treatment is carried out using a bath containing 0.2% of copper sulphate in place of the sodium bichromate, a greener shade is obtained.

Example 14

Viscose rayon fabric is padded in an aqueous solution containing 1% of 6-(4':6'-dichlorotriazinylamino)naphthalene-2-sulphonic acid and 0.5% of sodium alginate and is then dried.

The padded fabric is then printed with an aqueous printing paste containing 2% of 1:8-dihydroxy-4:5-diaminoanthraquinone-2:7-disulphonic acid, 10% of urea, 1.75% of sodium alginate and 1% of sodium bicarbonate.

The fabric is dried, then steamed for 10 minutes and rinsed, scoured, rinsed and dried as described in Example 1. A blue print is obtained, fast to washing.

A navy blue print on a white background is obtained if the above Example the padding solution contains 2% of the dyestuff described in Example 3 of Belgian specification No. 543,214 and 0.5% of sodium alginate, and the printing paste contains 2% of Naphthalene Dark Green A 200 in place of the 1:8-dihydroxy-4:5-diaminoanthraquinone-2:7-disulphonic acid.

Example 15

Cotton fabric is padded in an aqueous solution containing 2% of Example 3 of Belgian specification No. 543,214 and 0.5% of sodium alginate and dried.

The fabric is then printed with an aqueous printing paste containing 2% of Naphthalene Dark Green A 200, 10% of urea and 1.75% of sodium alginate and dried.

The fabric is then overprinted with a printing paste containing 2% of sodium bicarbonate and 1.75% of sodium alginate, then dried, steamed for 10 minutes and rinsed, scoured and rinsed as decsribed in Example 1 and dried.

The print obtained has a navy blue design where both printing pastes were applied, a red design where only the second printing paste was applied and a white background where the second printing paste was not applied.

Example 16

A length of plain weave cotton fabric is dyed to a 1% shade with Chlorazol Black BH in a jig-machine by the methods commonly used with direct dyestuffs and then dried. The dyed fabric is then padded to 100% expression with a solution containing 10 parts of sodium bicarbonate, 20 parts of 6-(4':6'-dichlorotriazinylamino)-naphthalene-2-sulphonic acid, and 2 parts of wetting agent in each 1000 parts, dried at 70° C. and steamed for 5 minutes at 102° C. The fabric is then washed, soaped with boiling detergent solution, rinsed and dried.

The fabric is thus dyed to a dull blue shade possessing excellent fastness to washing.

Example 17

If in Example 16 the Chlorazol Black BH is replaced by an equal quantity of Chlorazol Sky Blue FF, the fabric is dyed to a blue shade possessing excellent fastness to washing.

Example 18

A solution is prepared containing, in 96 parts of water, 3 parts of sodium hydroxide and 1 part of 6-(4':6'-dichloro-s-triazinylamino)naphthalene-2-sulphonic acid. 100 parts of cotton fabric, which has been dyed with a 2% shade of Chlorazol Black BH is impregnated with the above solution, squeezed to give a total weight of 200 parts and dried for 5 minutes at 70° C. The treated fabric is rinsed well until the wash-water is neutral and then dried.

The dyed fabric thus treated has better washfastness than a sample of the dyed fabric which has not been so treated.

Example 19

A solution is prepared containing, in 95 parts of water, 4 parts of sodium bicarbonate and 1 part of 6-(4':6'-dichloro-s-triazinylamino)naphthalene-2-sulphonic acid. 100 parts of cotton fabric which has been dyed with a 2% shade of Chlorazol Viscose Black BS (Colour Index No. 35255) is impregnated with the above solution, squeezed to give a total weight of 200 parts and then heated at 120° C. for 5 minutes. The treated fabric is rinsed well until the wash-water is neutral and then dried.

The dyed fabric so treated has better washfastness than a sample of the dyed fabric which has not been so treated.

There follows a list of compounds which may be used in place of the colourless water-soluble heterocyclic compounds used in the above examples:

1-(2':4'-dichloro-s-triazinylamino)naphthalene-7-sulphonic acid, 1-(2':4'-dichloro-s-triazinylamino)naphthalene-5-sulphonic acid, 2-(2':4'-dichloro-s-triazinylamino)naphthalene-7-sulphonic acid, 2-(2':4'-dichloro-s-triazinyl)methylaminonaphthalene-6-sulphonic acid, 4-amino-4'-(2'':4''-dichloro-s-triazinylamino)-diphenyl disulphonic acid, 2-(2':4'-dichloro-s-triazinylamino)ethane sulphonic acid, 2-(N-2':4'-dichloro-s-triazinyl-N-methyl)aminoethane sulphonic acid, 4:4'-bis(2'':4''-dichloro-s-triazinylamino)diphenyl disulphonic acid, 4-(2':4'-dichloro-s-triazinylamino)phenoxy-beta-ethyl sodium sulphate, 2-(2':4'-dichloro-s-triazinylamino)naphthalene-6:8-disulphonic acid, 1-(2':4'-dichloro-s-triazinylamino)naphthalene-4:6:8-trisulphonic acid, 4-(2':4'-dichloro-s-triazinylamino)benzene sulphonic acid, 3-(2':4'-dichloro-s-triazinylamino)-2-hydroxy-5-sulphobenzoic acid, 3-(2':4'-dichloro-s-triazinylamino)benzene sulphonic acid, 2:4-bis(2':4'-dichloro-s-triazinylamino)benzene sulphonic acid, 2-(2':4'-dichloro-s-triazinylamino)naphthalene-4:8-disulphonic acid, 2-(2':4'-dichloro-s-triazinylamino)naphthalene-1:6-disulphonic acid, 2-(2':4'-dichloro-s-triazinylamino)naphthalene-5:7-disulphonic acid, 2':4'-dichloro-s-triazinylamino-methane phosphonic acid, 2:3-dichloro-quinoxaline-6-carboxylic acid.

What we claim is:

1. Process for the coloration of cellulose textile material which comprises applying to said material an aqueous medium which contains (1) a dyestuff which contains an amino group-hydrogen atom which may be readily replaced by treatment with cyanuric chloride in aqueous medium at 20° C., (2) a water-soluble heterocyclic compound containing two —N=C(halogen) groups, and (3) up to 5% by weight of an alkali and in a subsequent step, subjecting the treated material to an elevated temperature of from 100 to 150° C.

2. Process as claimed in claim 1 characterised in that said alkali, heterocyclic compound and dyestuff are applied by padding the textile material in a single aqueous solution containing the alkali, heterocyclic compound and dyestuff.

3. Process as claimed in claim 1 characterised in that said textile material is first dyed and the dyed textile material is thereafter treated with an aqueous solution of said heterocyclic compound and alkali.

4. Process as claimed in claim 1 wherein said alkali used is a mild alkali.

5. Process as claimed in claim 1 characterised in that the dyestuff used contains a metal-complex forming system and the process incorporates a treatment with a metal-yielding agent.

6. Process as claimed in claim 1, characterised in that the subsequent heating step is carried out at between 100° C. and 150° C. for a period requiring 3 minutes to 30 minutes.

7. Process as claimed in claim 1, characterised in that the subsequent steaming step is carried out at between 100° C. and 130° C. for a required period of time between 3 minutes and 1 hour.

8. Process as claimed in claim 1 characterised in that said textile material is padded in an aqueous solution of the heterocyclic compound and dried, and the dried textile material is then treated with said dyestuff and said alkali.

9. Process as claimed in claim 8 characterised in that the treatment with the dyestuff and the alkali is carried out by padding the textile material in an aqueous solution containing said dyestuff and said alkali.

10. Process as claimed in claim 8 characterised in that the treatment with the dyestuff and the alkali is carried out by printing the textile material with a printing paste containing the dyestuff and the alkali.

11. The process of claim 10, wherein said printing paste contains sodium alginate as a thickening agent.

12. Process as claimed in claim 1 characterised in that said alkali, heterocyclic compound and dyestuff are applied by printing the textile material with a single printing paste containing said alkali, heterocyclic compound and dyestuff.

13. Process as claimed in claim 12 characterised in that the printing paste contains sodium alginate as thickening agent.

References Cited in the file of this patent
UNITED STATES PATENTS

| | | |
|---|---|---|
| 2,835,663 | Bentz | May 20, 1958 |

FOREIGN PATENTS

| | | |
|---|---|---|
| 209,723 | Great Britain | Mar. 23, 1925 |
| 342,162 | Great Britain | Jan. 29, 1931 |